United States Patent [19]

Anzani

[11] 4,291,428
[45] Sep. 29, 1981

[54] PROCESS FOR THE MANUFACTURE OF MOULDED INSOLES

[76] Inventor: Onorio Anzani, 10 stesso, Parabiago - Frazione San Lorenzo, Italy

[21] Appl. No.: 109,272

[22] Filed: Jan. 3, 1980

[30] Foreign Application Priority Data

Jan. 11, 1979 [IT] Italy .............................. 19211 A/79
Aug. 6, 1979 [IT] Italy .............................. 24945 A/79

[51] Int. Cl.³ ....................... A43D 0/0; A43B 13/38
[52] U.S. Cl. ..................................... 12/146 B; 36/44
[58] Field of Search ................... 36/43, 44, 108, 30 R; 12/146 R, 146 B

[56] References Cited

U.S. PATENT DOCUMENTS 2,897,611  8/1959  Schaller ............................ 36/44
3,643,353  2/1972  Weight ............................. 36/44
3,892,077  7/1975  Wolstenholme et al. ............. 36/44

FOREIGN PATENT DOCUMENTS 1918537  7/1971  Fed. Rep. of Germany ......... 36/44

Primary Examiner—Patrick D. Lawson
Attorney, Agent, or Firm—Haseltine and Lake

[57] ABSTRACT

A process for manufacturing insoles from flexible, porous and stickable sheet plastic material by sheering the sheet to form a peripheral cut of the insole and an internal cut in the heel area to form an open area surrounded by a land area. The insole is then placed in a mold die and plastic is injected to fill in the open area and surround the land area to conform to a predetermined contour. The insole is stabilized in the die by a plurality of rods positioned within the die.

2 Claims, 11 Drawing Figures

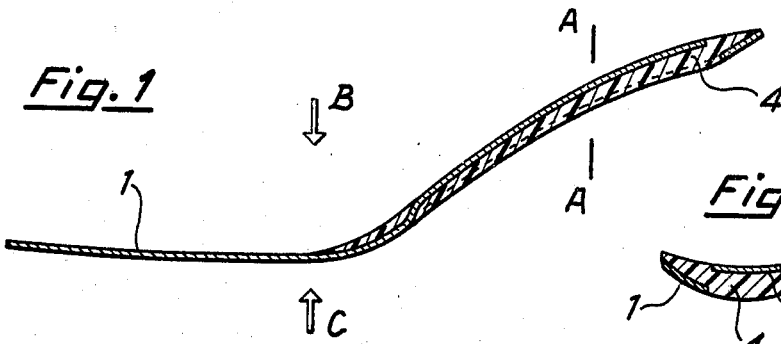
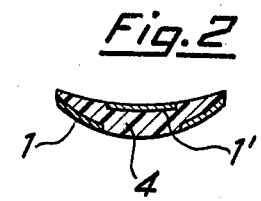
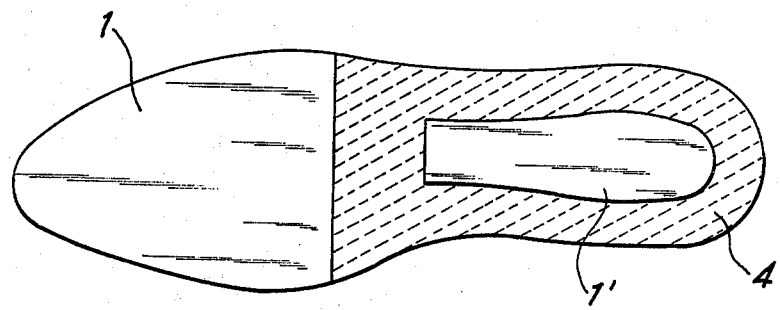
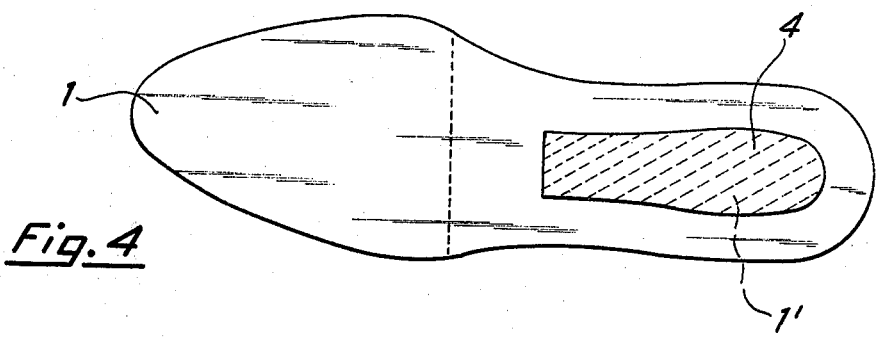
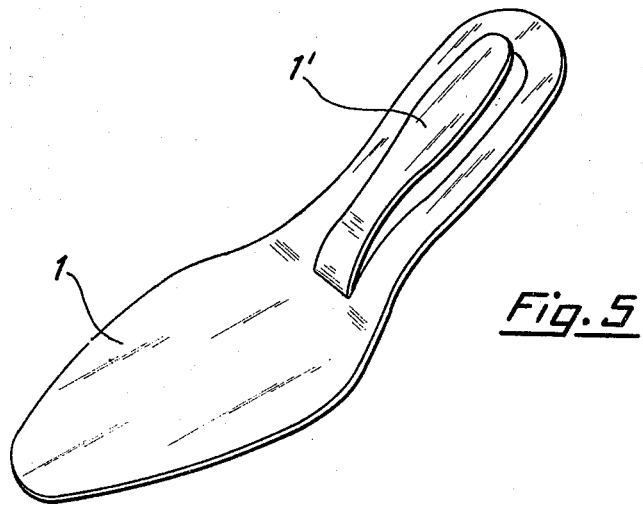

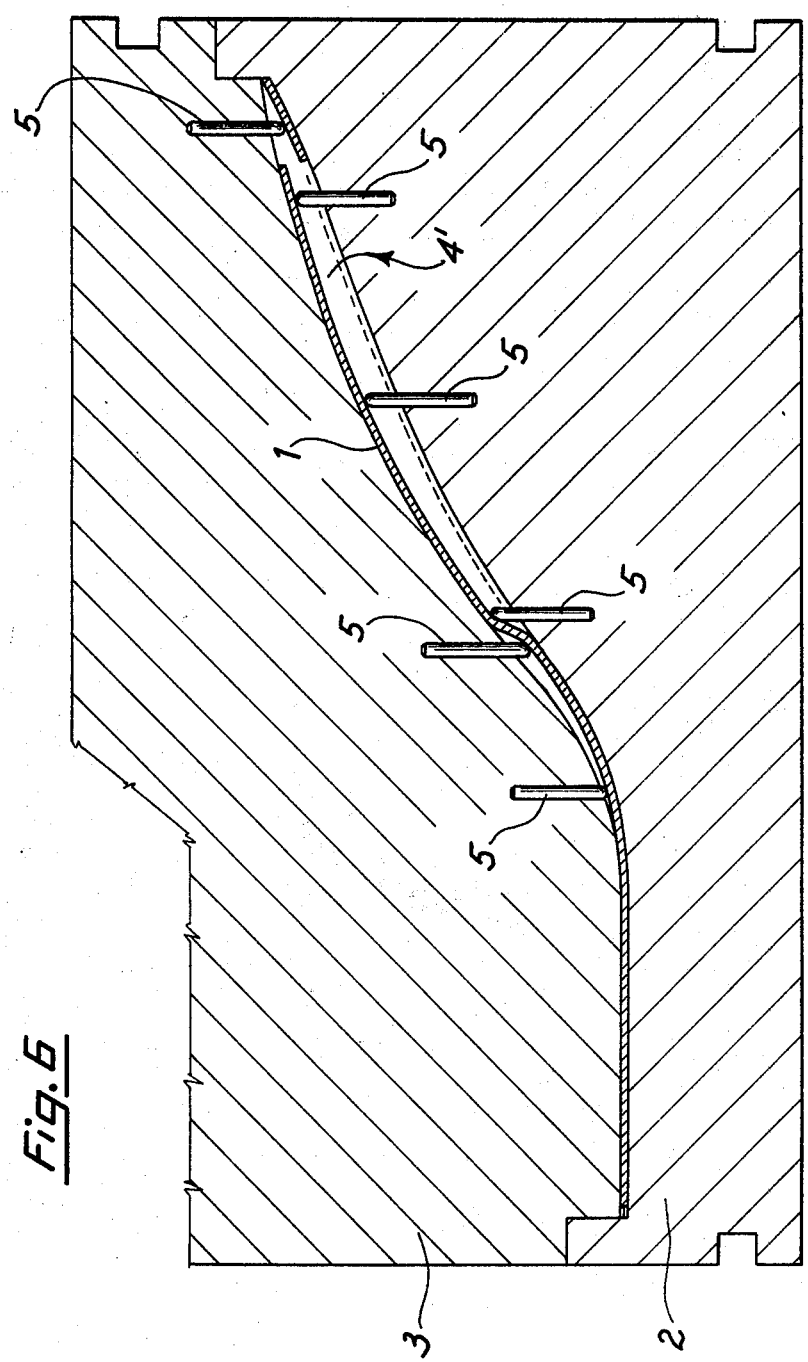

PROCESS FOR THE MANUFACTURE OF MOULDED INSOLES

It is the object of the present invention to provide a process for the manufacture of footwear insoles, substantially characterized in that the process consists of presetting and using simple material means and operative means, so as to be available at nearly any workshop and enabling to achieve the object by few and fast operations, saving time and labour, and allowing to achieve remarkable economical advantages and to produce high quality insoles conveniently insertable in footwears.

The prior art insoles at present available on the market, having similar features to those of the present invention, require for the manufacture thereof the use of bulky and expensive machines and the execution of many operations, with the ensuing passage from one to another machine and relative machine adjustment.

It is the object of the present invention to minimize the operations, passages and adjustments, with the final result of producing technically well assembled insoles, wherein the plastic mates any sheet material to be sheared which is flexible, porous and stickable by concentional adhesives, such as cellulosic cardboard, leather, imitation leather, and mixed materials of leather fibers and powders, so as to form therewith an integral unit, such insoles having on the outer faces thereof at different locations either the plastics or the sheet material depending on whether a sticking operation is to be effected or not on the emerging portion. Such a sticking may be effected without having to subject said sheet material to a previous carding operation.

An insole manufacture starts by preparing the basical sheet piece, such as cellulosic cardboard, in the form of a sole, which piece is neatly peripherally sheared, while at the same time a tongue is sheared more internally of the edge by the same shear iron and operation, which tongue may remain attached to the insole at one end thereof, particularly that end facing the hollow. A shearing with tongue removal is also provided.

After shearing on a horizontal plane, the basical sheet material piece is removed from the shear and die inserted, between die and dolly. Still prior to injecting the plastics or thermoplastic material, an insole here takes the conformation imparted thereto by the die and sets at such a position as to provide space for the plastic which will be successively injected.

In order to suitably shape the basical sheet and temporarily retain it in place, while retaining in place any rear tongue not following the general pattern of the sheet, but bifurcating to set at a short distance on a plane nearly parallel with that of the sheet, rods are provided within the die and integral therewith, which rods are nearly orthogonal to said sheet and serve the purpose of pointing thereagainst for provisionally immobilizing it awaiting that the injection of thermoplastic material settles the whole assembly and definitively combines the components to an integral unit.

When the die is re-opened upon completion of the operation, the rods would not interfere with the insole removal, but merely leave small holes therein.

The die rods are mainly directed to slightly raise any rear tongue of the insole, while downward retaining the edge or rim surrounding said tongue steady and adherent to the die.

By being peripherally sheared, except for one end where it was attached to the remaining insole, said tongue is located above a slot with relative underlying space, which space is intended to be filled along with other parts by the injected thermoplastic material.

The injected material will reach and fill up the space underlying the tongue, and will reach and cover by a reduced thickness said edge or rim surrounding said tongue, slightly forwardly extending beyond the tongue attachment in the direction of the point, becoming gradually thinner.

For a better explanation of the invention, an insole provided by the process according to the present invention is shown according to any embodiment by mere way of unrestrictive example in the accompanying drawings. Of course, any other embodiment of the present invention, either insole or process, on the ground of the same inventive concepts, or carrying into effect even in a different combination the features of the present invention, is within the field of the invention and hence within the property of the relative patent.

In the drawings:

FIG. 1 is an elevational longitudinal sectional view of the insole;

FIG. 2 is a cross-sectional view of the insole, substantially taken along line A—A of FIG. 1;

FIG. 3 is a plan view of the insole in the direction of arrow B;

FIG. 4 is a bottom view of the insole in the direction of arrow C;

FIG. 5 is a perspective view showing the insole, limited to the only cardboard as sheared peripherally and about the rear tongue, except for the attachment location;

FIG. 6 is a view showing the insole as clamped between the die and dolly, where the rods suitably distributed in the moulding zone provide for temporarily immobilizing the cardboard part or component, awaiting that the plastics material is injected and distributed in the preset spaces to include the cardboard and form therewith a compact integral piece;

Figure 7:
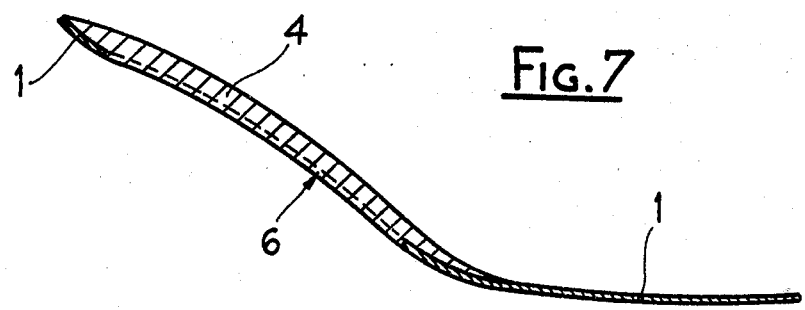
Figure 8:
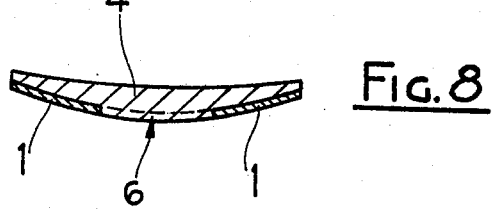
Figure 9:
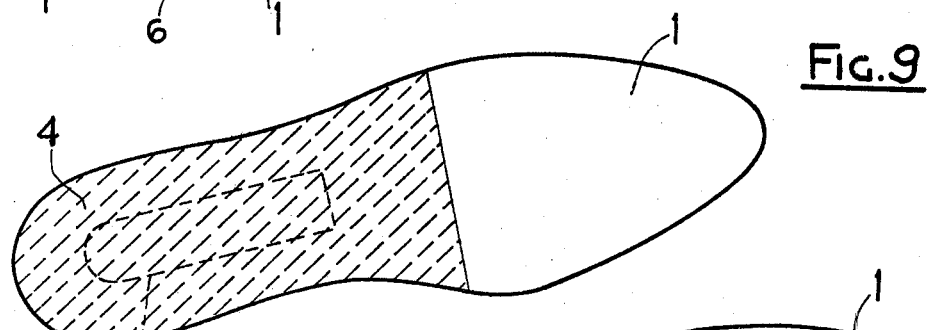
Figure 10:
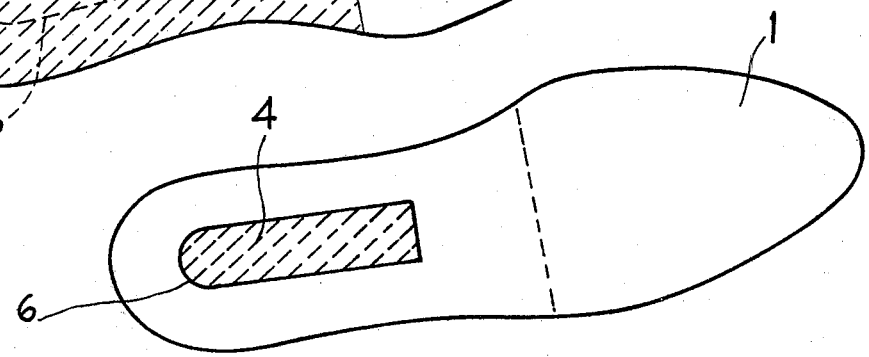
Figure 11:
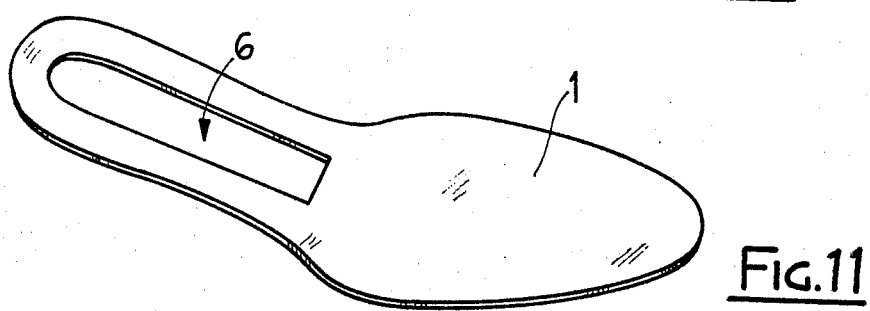

FIG. 7 shows the plastics material 4 connected to sheet 1 through the window 6 decreasing in thickness until connecting with the upper face of the insole;

FIG. 8 is a sectional view of the insole at the zone of slot 6 wherein numeral 1 is the sheet and 4 the resin;

FIG. 9 is a top view of said insole;

FIG. 10 is a bottom view of the insole, showing the distribution of the areas between the flexible, porous and stickable sheet 1 and plastics material 4 coupled thereto; and FIG. 11 shows the shearing operation with the removal of the tongue, wherein numeral 1 denotes the sheet of flexible, porous and stickable material as sheared to profile and provided with window 6.

By suitable operating means sheet 1 is sheared by using a blank or die cut capable of effecting in only one time the peripheral cut of the insole and a more internal cut at the zone underlying the heel, such a cut leaving an attachment at about the intermediate zone of the insole, so as to provide a tongue 2' extending from said attachment to the heel. Said tongue is intended to be raised and slightly dislodged from its seat for leaving room for the injection plastics material which in the die will fill up the space left under the tongue and expand by a reduced thickness over the frame surrounding the tongue.

From a top view of the insole (FIG. 3), it will be seen at the point and to the foot hollow the exposed sheet, whereas the latter will appear as covered from the end of the exposed zone to the rear end, except for tongue 1'. The frame of plastics material surrounding said tongue gradually lowers for a short length in the direction of the point, starting from the tongue attachment location.

From a bottom view of the insole (FIG. 4), it will be seen that the entire sheet is exposed, except for the portion underlying the tongue.

FIG. 2, which is a sectional view of the insole taken along line A—A, clearly points out the structure of said insole. Thus, it will be seen that said tongue 1' emerges at exposed condition flush with the plastic in which it is embedded, while a layer of plastic extends on the tongue sides and covers the frame surrounding said tongue for about the same thickness as that of the layer involving the underside of the tongue and leaves the frame underside exposed.

The process for the manufacture of the insole begins by shearing the sheet, with the die 2 and dolly 3 already at operating conditions, then continues by introducing the sheet into the die and closing the latter, and finally by injecting the plastics material 4.

The die is characterized in that the inner portion 4' thereof has suitably distributed and oriented rods, exerting at different locations a pressure action on sheet 1. The rods 5 perform the function of determining the pattern for the sheet and provisionally retaining the latter at stationary condition, awaiting that the injection of plastics material definitively stabilizes said sheet. Upon operation completion, the die opening is not interferred by rods 5, and neither the insole is prevented, in place of said rods only small holes remaining in such an insole.

Provision is also made for inserting a steel rib in the insole, at the rear portion thereof. In this case, such a rib will be placed in the die prior to closing the latter and will be embedded in the plastics material.

What I claim is:

1. A process for manufacturing footwear insoles, formed of a flexible, porous and stickable sheet and plastic material, comprising the steps of: shearing the sheet to form a peripheral cut of the insole and an internal cut at a zone underlying the heel to thereby provide a tongue at said zone; placing the so formed insole between a die and dolly provided with a plurality of spaced rods for engaging upper and lower surfaces of said insole; stabilizing the insole and tongue in the die by urging communication of said insole and tongue with said rods, conforming the insole to the die and raising the tongue up to the dolly, and injecting the plastic material between the insole portion and the tongue to conform to a predefined contour.

2. A process for manufacturing footwear insoles formed of a flexible porous and stickable sheet and plastic material, comprising the steps of: sheering the sheet to form a peripheral cut of the insole and an internal cut at a zone underlying the heel to form an open area within said zone having a surrounding land area contiguous with said insole; placing said insole between a die and dolly provided with a plurality of spaced rods for engaging upper and lower surfaces of said insole; stabilizing the insole in the die by urging communication of said insole with said rods, conforming the insole to the die, and injecting the plastic material to fill the open area and surrounding land area to conform to a predetermined contour.

* * * * *